United States Patent [19]

Massie et al.

[11] Patent Number: 5,777,461
[45] Date of Patent: Jul. 7, 1998

[54] DC-DC CONVERTER FOR MOBILE APPLICATION

[75] Inventors: Harold L. Massie, West Linn; G. Mark Johnston, Portland, both of Oreg.

[73] Assignee: Intel Corporation, Santa Clara, Calif.

[21] Appl. No.: 799,385

[22] Filed: Dec. 31, 1996

[51] Int. Cl.⁶ .................................................. G05F 1/56
[52] U.S. Cl. .................................................. 323/282
[58] Field of Search .............................. 323/266, 270, 323/271, 282, 285, 289, 351

[56] References Cited

U.S. PATENT DOCUMENTS

| | | | |
|---|---|---|---|
| 4,001,721 | 1/1977 | Fukuda | 323/907 |
| 4,009,432 | 2/1977 | Dungwall | 323/267 |
| 5,386,200 | 1/1995 | Limberg | 330/288 |
| 5,404,096 | 4/1995 | Thiel | 323/312 |
| 5,534,771 | 7/1996 | Massie | 323/285 |

*Primary Examiner*—Matthew V. Nguyen
*Attorney, Agent, or Firm*—Kenyon & Kenyon

[57] ABSTRACT

A DC-DC voltage conversion provides a voltage to a processor in a mobile computer system using a high side power FET and a low side power FET, each having a variable gate discharge time dependent on the applied battery voltage. The power FETs are arranged in a synchronous totem pole configuration with a junction point therebetween, coupled between a voltage input terminal and ground, with the junction point coupled to a voltage output terminal. Each of the power FETs is driven by a FET driver, with the driver being coupled to the output of a comparator comparing a reference voltage with the output voltage. To avoid cross-conduction, the high side power FET and the low side power FET are coupled to each other in such a manner that the event of one turning off will turn on the other after a dead time determined by the threshold sense circuit, plus delays of the devices used in the embodiment.

28 Claims, 2 Drawing Sheets

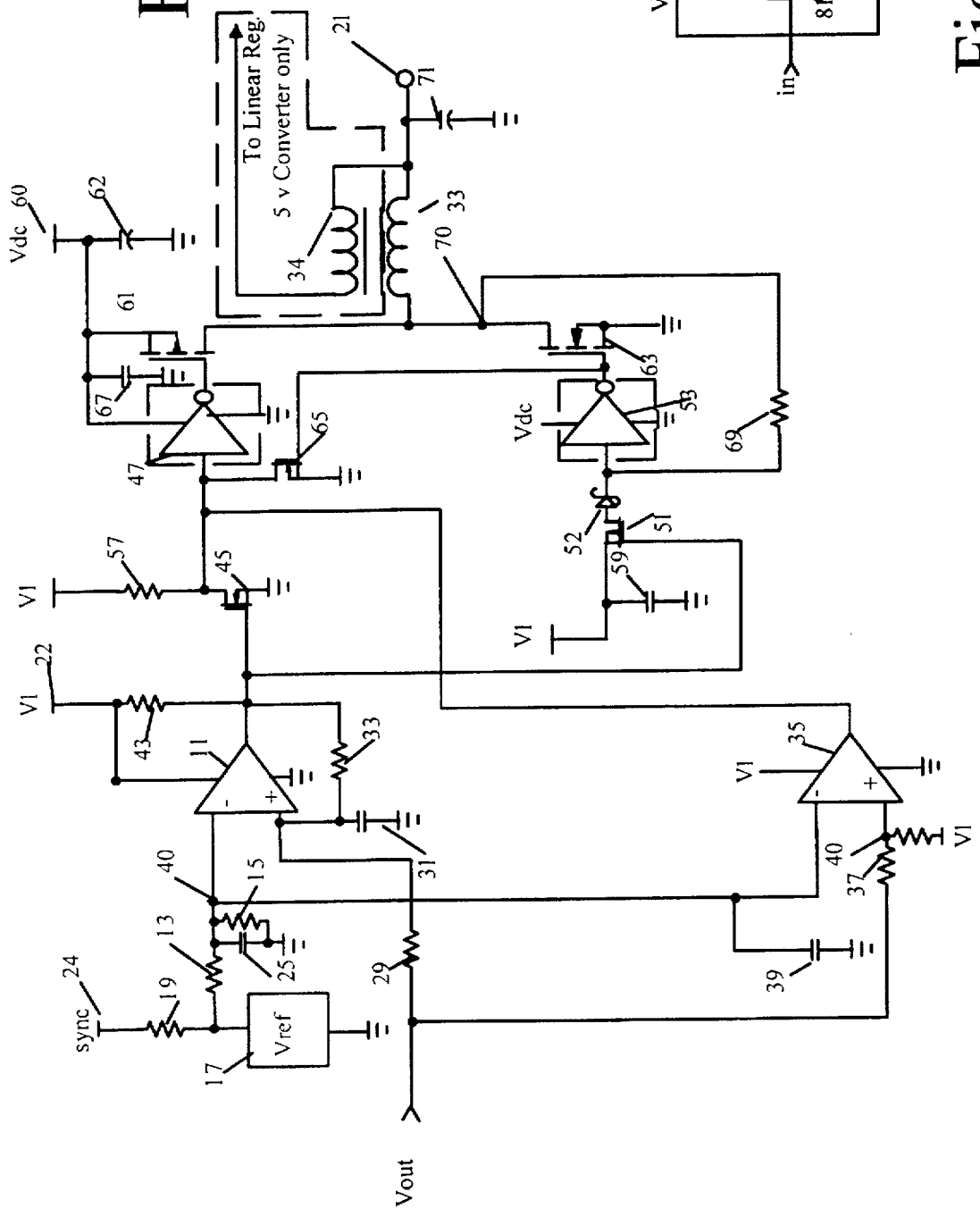

DC-DC CONVERTER FOR MOBILE APPLICATION

BACKGROUND OF THE INVENTION

The present invention relates to DC-DC converters in general, and more particularly a DC-DC converter for use with mobile computers.

As described in the background portion of U.S. Pat. No. 5,534,771, assigned to Intel Corporation, the assignee of the present invention, integrated circuits utilized in computer systems typically require several DC voltages, one of these being a voltage of about 5 volts to operate TTL (Transistor-Transistor Logic) type devices and then lower voltages to operate CMOS (Complimentary Metal Oxide Semiconductor) devices, and processors. Current processors such as PentiumPro® processors utilizing CMOS technology manufactured by the Intel Corporation for mobile use (e.g., laptop computers) operate on the order of 2.9 volts. The processors in these computers, which are provided for the mobile environment, typically require two processor voltages: a core voltage and an I/O voltage. These voltages must be precisely regulated.

As is the case with the DC (direct current) to DC converter in U.S. Pat. No. 5,534,771, DC to DC converters typically are switching voltage regulators which are more efficient than linear regulators above a value of about 200 mW load power. Although attempts have been made to reduce the cost of switching regulator converters, there is still a need to further reduce the cost by providing a design which can be implemented with discrete components. In particular, there is a need for improvement in a type of switching circuit which arranges FETs (field effect transistors) in a synchronous totem pole configuration to reduce losses in the lower element by replacing the diode used in previous circuits with a low on-resistance FET. In such a synchronous design, it is desirable to prevent damaging crosscurrent conduction in the FETs and, in particular, for mobile applications, even nondamaging conduction is undesirable. The ability to do this with a minimum number of components, cost expense and minimal use of board real-estate, is also desirable and is important in the mobile application.

There is also a need for a low cost method of short circuit protection to reliably turn off the output of the converter in the case of a short circuit. Furthermore, the design should take into consideration problems which can occur during start up, when the full voltage is not supplied to the converter, and also problems associated, particularly in the mobile environment, with turning the converter off or powering it down when it is not needed and the processor is in an inactive state. This is important to increase battery life.

SUMMARY OF THE INVENTION

These needs are solved by an embodiment of a DC-DC converter circuit which has a voltage input terminal and a voltage output terminal. A first comparator has a first input, coupled to a voltage reference and a second input, coupled to the voltage output terminal. The comparator's output is eventually coupled to the inputs of a first FET driver and a second FET driver. The FET drivers, respectively, drive a high side power FET and a low side power FET, each having a turn on time arranged in a synchronous totem pole configuration, coupled between a voltage input terminal and ground. The high side power FET and the low side power FET are coupled to each other in such a manner that the event of one FET being sensed off will turn on the other FET after a status level is sensed true.

BRIEF DESCRIPTION OF THE DRAWINGS

FIG. 2 is a circuit diagram of an embodiment of a DC-DC converter according to the present invention.

FIG. 3 is a circuit diagram of a FET driver constructed of discrete components useable in the embodiment of a DC-DC converter according to FIG. 2.

DETAILED DESCRIPTION

Figure 1:
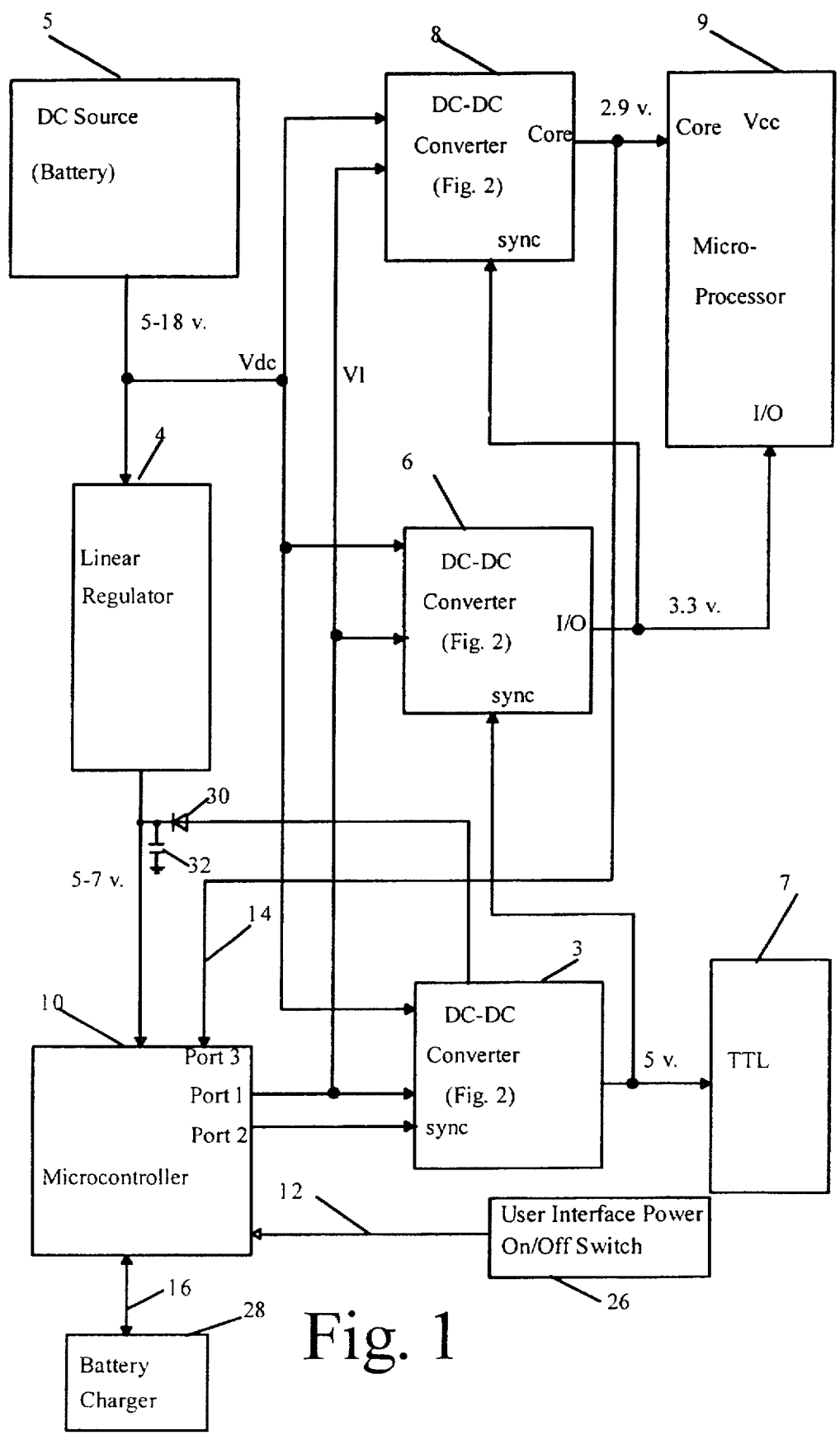
FIG. 1 is a block diagram of an embodiment of a computer system utilizing an embodiment of a DC-DC converter according to the present invention.

FIG. 1 is an overall diagram of a mobile computer system including an embodiment of the DC to DC converter(s) of the present invention. Although the voltage regulator described herein is an embodiment directed specifically to a mobile computer requiring, e.g., output voltages of 5, 3.3 and 2.9V, the invention is not so limited. Embodiments for other computer systems and other electronic devices which require DC-DC conversion can also be constructed in accordance with the present invention.

The mobile computer system is powered by a DC power source 5 which will be the mobile computer's battery or power source that is recharged from an AC (alternating current) to DC converter (not shown in FIG. 1). A microcontroller 10 within the computer system is powered by DC power source 5 via a linear regulator 4. The linear regulator may have an output of 5V, for example. Its output is backdriven to 7V when a +5V DC-DC converter 3 is turned on as described below. DC power source 5 also provides a voltage input Vdc (e.g., ranging between 5 and 18V) to +5V DC to DC converter 3, a DC-DC I/O (Input/Output) converter 6 (3.3V), and a DC-DC core converter 8 (2.9V), each constructed according to an embodiment of the present invention, such as that described below in connection with FIG. 2. The output of +5V DC-DC converter 3 is provided as the voltage source for various TTL circuits 7. The outputs of DC to DC I/O converter 6, and DC-DC core converter 8 are supplied as the core and I/O voltages of a processor 9, e.g., a PentiumPro® processor.

In conventional fashion, the microcontroller 10 monitors, e.g., a user interface 26, and a battery charger 28 via lines 12 and 16 respectively. Microcontroller 10 also controls the turning on and off of the DC-DC converters via ports 1 and 2. The output of port 1 is coupled to each of the converters 3, 6 and 8. When a port 1 output controlling V1 is at ground, it effectively keeps high side FETs in converters 3, 6, and 8 from draining the DC voltage source 5 when the converter is turned off as explained below. To activate the system, microcontroller 10 provides, at the port 1, a Vcc voltage V1, and then at a port 2, a sync output which is coupled to +5V DC to DC converter 3 as its "sync" input. Converter 3 provides its voltage output as a sync input to I/O converter 6, which in turn provides its voltage output as a sync input to converter 8.

FIG. 2 is a circuit diagram of an implementation of an embodiment of the present invention which can be used as converters 3, 6 and 8 of FIG. 1. The circuit converts an input voltage Vdc, e.g., from voltage source 5 of FIG. 1 at terminal 60 to an output voltage at terminal 21 by controlling the switching of two FETs 61 and 63 in a synchronous totem pole configuration.

As illustrated in FIG. 2, a reference comparator 11 has its inverting input coupled through a resistor 13 to the output of a voltage reference 17. Reference 17 is coupled to a voltage input node 24 to which the "sync" voltage is supplied, for example, from microcontroller 10 or another converter through a bias resistor 19. Resistor 19 is a pull-up resistor that provides bias current to the precision voltage reference 17. Its value must also consider the current pulled by resistor 15 in addition to the minimum current required for the reference itself (see FIG. 1). Reference 17 may be a low-power type, e.g., having a bias current 60 uA, typical. This allows the bias resistor 19 to be made sufficiently large to reduce power consumption by the reference. As explained above, application of the voltage "sync" is used to turn the converter on in a controlled manner. As also noted above, in the embodiment shown in FIG. 1, the 5V converter 3 obtains its sync input from the microcontroller 10, the 3.3V I/O converter 6 obtains its sync input from the output of 5V converter 3 and the 2.9V core converter obtains its sync voltage from the output of 3.3V converter 6. In this way the processor 9 may receive both its voltages, e.g., both 3.3 and 2.9V, in proper sequential timing as usually deemed necessary in processor applications.

The circuit uses voltage V1 as the operating voltage for comparator 11 and other parts of the circuit. Voltage V1 is initially 5V±5%, although 7V is preferred for the best circuit efficiency in driving FETs. In an optional embodiment of the 5V converter 3 such an increase to 7V may be obtained from a special boost winding 34 of an inductor 33 in the output circuit of converter 3. A winding 34 and core is provided, in addition to inductor 33. The output of winding 34 is coupled through a diode 30 (see FIG. 1) to the output of linear regulator 4. The cathode of diode 30 is coupled to ground through a capacitor 32. The voltage across the primary winding of inductor 33 is a constant 5V when inductor 33 is releasing its stored energy, during operation of the converter to be explained below. In other words, FET 61 is off and FET 63 is on. By adding winding 34, the device becomes a transformer. In this embodiment, which is an option only in the 5V converter 3, the primary winding 33 between terminals 70 and 21 may have 10 turns. The calculated boost factor is 0.5V/turn. Placing five turns on the secondary will provide 7V when the drop through diode 30 of FIG. 1 is included. Thus the +5V output is being boosted by 5 times 0.5V/turn or 2.5V. Diode 30 is back biased when the alternate inductor phase occurs. Capacitor 32 supplies energy to the connected load until the boost winding recharges capacitor 32. The boost winding eliminates the 1.2 w being dissipated in the linear regulator at peak battery voltage conditions. This gives better system efficiency.

The micro-controller 10 asserts its port outputs to be logic "one" or logic "zero" as indicated in connection with FIG. 1. As noted above, a port 1 of microcontroller 10 provides V1 to each of comparators 3, 6 and 8, then port 2 provides a sync input to the converter within the system having the highest output voltage, in the example of FIG. 1, the 5V converter 3.

The inverting input of comparator 11 is also coupled through a resistor 15 and capacitor 25 in parallel to ground. The circuit including resistors 13 and 15 and capacitor 25 provide a network to condition the converter's power-up response and divide down the reference voltage. Capacitor 25, in conjunction with resistor 13, causes the converter's output voltage to rise slowly on the output bulk capacitors 71 described below and thus keeps peak currents minimized. Resistors 13 and 15 divide down the reference voltage before the derivative is presented to the regulation comparator 11. Resistor 13 also isolates reference 17 from detecting capacitor 25 as a capacitive load, and eliminates possible oscillation of the reference device.

The non-inverting input of comparator 11 receives the voltage Vout fed back from the output terminal 21 of the regulator circuit through resistor 29. The non-inverting input is also coupled to the output of comparator 11 through a resistor 33 and is coupled to ground through a capacitor 31. The regulated output voltage, Vout, being provided by the converter, in the illustrated embodiment, as noted above, is typically either 5, 3.3 or 2.9V, but will vary, depending on the devices being powered. Comparator 11 compares the output voltage against a derivative of the reference voltage being output by voltage reference 17 which defines what the output regulation value should be. In a mobile computer application, the regulated voltage supplied to the processor is generally set at the factory per mobile processor lot used. Resistors 29 and 33 determine the amount of dc hysteresis to be applied to the comparator's non-inverting input. Their design values provide fine tuning of the switching frequency for this asynchronous style converter, and are chosen for optimal converter efficiency at nominal loading. Capacitor 31 in conjunction with resistor 29 provide high-frequency decoupling if required.

The output voltage Vout at terminal 21 is also coupled through a resistor 37 to the non-inverting input of a short circuit protection comparator 35. The inverting input of comparator 35 is coupled to the inverting input of comparator 11, i.e., to the derivative of voltage reference 17. A capacitor 39 provides high-frequency decoupling of the non-inverting input to ground. In addition, the voltage V1 at terminal 22 is coupled through a resistor 41 to the non-inverting input of comparator 35. Comparator 35 has the function of protecting the power FETs 61 and 63 (to be described below in more detail) from short circuits. A short circuit is defined as a negative-going abnormal transient that exceeds the factory-fixed offset provided by the two resistors 37 and 41 on the non-inverting input of comparator 35. The amount of offset is obtained by multiplying (V1−Vout) by the ratio of the voltage divider comprising resistor 37 and resistor 41, i.e., the resistance of resistor 37/(the resistance of resistor 37+the resistance of resistor 41).

At least the "sync" voltage at node 24 providing power to the reference 17 via resistor 19, must be re-cycled to clear the latch-off of the circuit. Recycling of this voltage and the voltage V1 at terminal 22 is also possible. In an embodiment such a FIG. 1, with more than one converter, regardless of which converter output was shorted, the microcontroller 10 will have to remove power from the first voltage reference in the series of converters (see FIG. 1), to eventually clear the fault. During the fault no converter will be in an overcurrent condition because the anti-ring diodes inside the processor chip set will remain back-biased, as is true even during normal operation.

Thus, resistors 37 and 41 form a two-resistor network which provides an offset voltage applied to the non-inverting input of comparator 35 to be, e.g., 250 millivolts above the reference voltage at node 40, i.e., at its inverting input. The amount of offset required, takes into consideration the expected transient deviation of the connected load, e.g., a processor, plus some guard band to prevent false tripping. When the short-circuit condition occurs, i.e., Vout has fallen, e.g., 250 millivolts below the reference, the output of comparator 35 negates the undesirable forthcoming action of comparator 11 by pulling down on the input of a FET driver 47. The converter goes into a latched-off condition causing FET 61 to shut off and voltage Vout to go to zero. After the condition for short-circuit has been removed, the operation of the converter is restored by re-cycling the voltage specifically at terminal 24, i.e., the top side of resistor 19. As noted above, it is permissible to recycle this and all V1 nodes at once without endangering the power FETs 61 and 63. To bring the converter outputs down in a faster and more orderly fashion, the "sync" input to +5V converter 3 provided by the microcontroller port 2 is first brought low. Then after another port 3 senses Vcore decreasing below zero via line 14, the microcontroller sets the V1 port 1 to zero volts. (see FIG. 1).

FET driver 47 has three sources of input with an output having a NAND result. Any source can inhibit high-side power FET 61 by pulling low on the input of the FET driver 47. The output of comparator 11 is coupled through pull-up resistor 43 to voltage V1. This output point is coupled to the gate of an n-channel signal FET 45 the output of which is coupled to the input of a FET driver 47. FET 45 is coupled to V1 through a pull-up resistor 57 at its output to provide a pull-up for the FET driver input. N-channel signal FET 45 inverts the signal from comparator 11 and comparator 35 or signal FET 65 to also inhibit the high-side power FET 61. At the input of inverting FET driver 47 (i.e., at node 77), a low level from any of FET 45, FET 65 or comparator 35 will turn off FET 61.

The output of comparator 11 is also coupled to the gate of a p-channel signal FET 51 the output of which is coupled through a Shottky diode 52 to a FET driver 53. N-channel FET 51 disallows power FET 63 from being "on" at the same time as FET 61, and prevents cross-conduction current that might flow from Vdc to power ground through both FETs 61 and 63. In the illustrated embodiment, a suggested value for Rds_on in FET 51 is less than 10 ohms, preferably one ohm if the tapped inductor option, i.e., winding 34 is not utilized in +5V converter 3. The source of FET 51 is coupled directly to V1. A decoupling capacitor 59 provides a local current source for a momentary peak current, drawn through the p-channel FET 51 caused by a terminating resistance 69 described in more detail below. In one embodiment a resistance of about 100 ohms has been found to be a good value for the reasons set out below.

Shottky diode 52 prevents the backflow of current from voltage node 70 to V1 via the path of the driving resistance 69. A value of about 100 ohms for resistor 69 provides optimal dead time efficiency by quickly driving the input of FET driver 53 low when node 70 drops below the threshold of the input of FET driver 53. Although it is possible to design-out diode 52 by increasing driving resistance 69, this will degrade the converter's efficiency by delaying the turn-on of FET 63.

Diode 52 and resistor 69 form a NOR function to turn off and keep off FET 63 respectively. The input at FET driver 53 will be high if FET 51 is on or if the voltage at node 70 is high. Similarly, the output of FET driver 53 is coupled to low-side N-channel power FET 63. The circuit design of this embodiment requires the input threshold for FET driver 47 to be in the range of 0.4V to 4.3V and that of FET driver 53 to be in the range of 0.4V to 3.6V. High side power FET 61 in this embodiment is a p-channel type having a low Rds_on. In particular, a 4435 is currently the optimal device. Low-side power FET 63 provides high-converter efficiency. In particular, a 4410 has been found to work well. Of course, the invention is not limited to these devices. In the illustrated embodiment, the usual Shottky diode bypass agent on FET 63 is omitted. This embodiment of the converter allows usage of the FET's internal diode during the dead time interval. No significant power loss occurs if the time is kept brief.

The power path input voltage Vdc at terminal 60, to be converted, which also provides the operating voltage for FET drivers 47 and 53, is coupled to the source of FET 61. Typically, in an embodiment for use with a mobile computer, Vdc is in the range of 5V to 18V. This node 60 should have surge protection (not shown) to protect the gates of the power FETs 61 and 63 from exceeding Vgs_max. A decoupling capacitor 67 couples Vdc to ground. It is located by the Vcc input pin of FET driver 47 and 53 to eliminate any high-frequency noise from entering the internal digital portion of FET drivers 47 and 53. Noise is caused by the switching of high-currents through the circuit board. Capacitor 62 provides bulk stored energy for FETs 61 and 63.

The drain of FET 61 is coupled to the drain of FET 63, the source of which is coupled to ground. The junction 70 between the drain of FET 61 and drain of FET 63 is coupled to inductor 33, the output of which provides the output voltage of the DC-DC converter, Vout, at output terminal 21. In one embodiment, inductor 33 may be an averaging inductor that should be made from low-loss core material and optimal wire sizing to result in optimal converter efficiency for the mobile environment. Vout terminal 21 is coupled to ground through one or more capacitors providing a bulk capacitance 71. This provides bulk decoupling that meets the step-current and capacity requirements of the connected load, for instance a processor with which the converter is used, e.g. an Intel Pentium® processor. When the system, e.g., a computer system with which this embodiment of the converter is used, is turned off, the charge of the output capacitors 71 may be bled away through the use of the inductor 33 and low-side FET 63. This method uses the parts already in the circuit, which avoids additional expense of adding specialized parts for this bleeding function. This bleeding occurs as soon as the voltage at terminal 21 discharges below the input threshold at FET driver 53 as when a short condition latches off the converter. Bleeding will also occur when a sync is set to zero by the microcontroller port 2 or the previous converter output.

The input of FET driver 47 is coupled through an n-channel signal FET 65 to ground to disallow power FET 61 from being "on" at the same time as FET 63. This prevents a cross-conduction current that might flow from Vdc to power ground through both FETs. FET 65 has its gate coupled to the output of FET driver 53, and senses the moment when the stored gate charge has been completely drained off the power FETs 11 gate.

Resistor 69 couples the output from FETs 61 and 63 to the input of FET driver 53. This small-wattage resistor operates in high-peak power condition, but low average power. As noted above, in one embodiment, 100 ohms has been found to be a good value for this resistor. In operation, when the regulation comparator 11 wants to turn-off the low side FET 63, its output goes low, causing p-channel FET 51 to impress voltage V1 minus one diode drop, across the resistor 69. The opposite end of resistor 69 is at approximately ground potential, due to power FET 63 still being in its turned-on state. When the impressed voltage exceeds the input threshold level of the FET driver 53, its output changes state and thereby turns off the low-side power FET 63. The length of the peak power pulse applied across resistor 69, is the short dead-time interval determined by the additive effects of the input to output delay time of FET driver 53, FET 65 parasitic capacitances, and the widely variable power-path source voltage Vdc at terminal 60, until the time the polarity of inductor 33 reverses. For the illustrated embodiment, the average power dissipation of the, e.g., 100 ohm termination resistor 69, as a result of the pulsed activity is less than 3 milliwatts. The variation in the power-path source voltage, e.g., the battery voltage results in a variation in the gate discharge time of the power FETs. Operation of the illustrated embodiment of the circuit of the present invention is not affected by these variations in gate discharge times.

Once the low-side FET 63 has been turned off, it can be seen that the n-channel signal FET 65 has also been turned off. This now results in the input to the high-side FET driver 47 being pulled up to V1 by pull-up resistor 57. When its input threshold level is exceeded, the output of FET driver 47 changes to a low-state, resulting in the turn-on of the high-side p-channel power FET 61. Also, a desirable positive feedback situation occurs when the resistor 69 drives the input of the FET driver 53 toward a level of Vdc at terminal 60 via power FET 61, therefore ensuring complete turn-off of the low-side FET 11, even in poor circuit board layout conditions.

When the comparator 11 senses the need to turn off the high-side power FET 61 to maintain precise regulation, the comparator output goes high, being pulled up through resistor 43. Through the path of FET 45 and FET driver 47 the power FET 61 is turned off. When high-side power FET 61 is turned off, the averaging inductor 33 causes current to flow from the power ground, proceeding through the internal diode of the low-side power FET 63, and then towards the inductor. Any prolonged usage of the internal diode of FET 63 to conduct this current would result in degradation in efficiency performance. However this is not the case in the illustrated embodiment, since resistor 69 is pulling the input of FET driver 53 to slightly below ground, and the gate of FET 63 is driven high, making FET 63 conduct current more efficiently.

As can be seen from the description above, FETS 61 and 63, arranged in a totem pole configuration, operate in a synchronous manner, such that when FET 61 is turned on, FET 63 is turned off and vice versa. To prevent both FETs from being on at the same time, i.e. to prevent cross conduction due to gate drive overlap, two nodes are sensed for status voltage level. This is accomplished using low-cost, discrete components. N-channel signal FET 65 has an intrinsic threshold reference for sensing the status voltage node located at the junction 75 of the low-side power FET 63 and its driver 53. In this embodiment, the high-side driver 47 input is not allowed to go high until the low-side power FET's gate has been driven below the Vgs threshold of FET 65. Therefore, FET 65 is required to have a gate threshold voltage that is less than or equal to the gate threshold voltage of the low-side power FET 63. Otherwise, if the sensing FET 65 has a threshold above that of the low-side FET, there comes a dependance upon the propagation delays of the devices (which is undesirable) unless this delay is consistent and results in better cost savings.

The resistor 69 senses the other status voltage node 70 located at the junction of the two totem-pole power FETs 61 and 63. The status node 70 waits for a response of the inductor 33 before allowing the low-side element to conduct more efficiently. Until the low-side FET gate is driven high, the peak power dissipated in the intrinsic diode is high. In this embodiment, it is precisely sensed when the inductor has reversed its polarity in response to high-side power FET 61 turning off. The release of energy from the inductor 33 causes a current to flow from the power ground, proceeding through the intrinsic diode contained within the low-side power FET 63, and then continues the flow towards the inductor 33. When the diode conducts, node 70 has fallen to 0.7V below ground. This status level signals the low-side FET driver 53 to drive high the low-side power FET 61 into better conduction efficiency.

This break-before-make method automatically compensates for wide variance in the input supply voltages. It also compensates for variance in the delay times of FET drivers, making matched drivers a non-necessity, compensates for the variance in the source and sink impedance of the drivers and the parasitics of the FETs.

This design utilizes a low-cost, innovative method of short-circuit protection. Comparator 35 provides output short circuit protection by detecting a condition when the output voltage is lower than the reference voltage. The output of comparator 35 will turn off FET 61 through FET driver 47 and go into a latch condition. As noted above, a shorting condition exists when the reference voltage is more than, e.g., 250 millivolts (a design variable) above the instantaneous output voltage. Comparator 35 actively senses for the presence of a short circuit condition under turn-on, steady-state, and dynamic operation of the converter. The circuit is self-latching.

At least some comparators, such as the LM393 comparator, which can be used in the illustrated embodiment, have one bad effect when a Vcc operating voltage is applied to them. Until the Vcc, in this case V1, voltage is above 2V, the output gives an unexpected high state. In other words, the output response does not track the input signal levels applied to its inputs, in this case Vout and the reference voltage. When the Vcc has risen above 2V, the output gives the expected switching states at the converter power-up transient. Because of this problem with comparators, the state levels of the included control devices, spanning from comparator 11 to power FET 61, during the power-up interval, are such as to keep power FET 61 turned off. This is also true during steady state operation, whereas, when comparator 11 output is asserted high, the power FET 61 will be turned off. Thus, the erroneous output state of the typical comparator with its Vcc supply still below 2V, is cured in this design, and protects the output capacitors from damaging inrush currents at power-up of the circuit's V1 supply.

The power path input voltage Vdc does not require special interruption when the converter is turned off. The V1 voltage asserted to the low state by microcontroller 10, pulls down the input of FET driver 47 via resistor 57 and effectively keeps the high-side FET from draining the battery. The FET drivers 47 and 53 are always powered by Vdc. Fortunately, the design allows the input of both of FET drivers 47 and 53 to be set to zero volts when the converter is turned off. The FET drivers 47 and 53 pull only 0.6 milliamps under these conditions. Otherwise 10 times more current would be drawn from the battery. For synchronous style converters running at zero load, there is about 15 mW power path losses plus −250 mW of fixed losses due to switching. These losses will cease when the converter is powered down.

The integrated FET drivers 47 and 53 can be replaced by a discrete version shown in FIG. 3 which is comparatively less expensive. Another advantage of using the discrete version is the opportunity it provides to run each driver from more appropriate Vcc voltage sources. Sourcing the low-side gate drive 53 from +5V or +7V (7V preferred), rather than Vdc will result in better converter efficiency. Some integrated FET drivers have an input diode clamp to the driver's Vcc pin. These are not compatible with the embodiment of the present invention described above where Vcc is 5–7V yet the input of the FET driver is being driven upwards of 18V via the resistor 69. This clamp diode will cause unwanted power dissipation to occur and also cause poor regulation of V1. The embodiment shown in FIG. 3, however, has no input diode clamp present and is therefore a better method for driving the low-side power FET 63. The high-side FET driver 47 requires the same voltage source Vdc as the p-channel power FET it drives.

In the embodiment of FIG. 3, the input of the driver is coupled to the gate of a FET 81. The source of FET 81 is coupled to ground and its drain coupled through a resistor 82 to Vcc. The junction between the drain of FET 81 and resistor 82 is also coupled to the base of a transistor 83 and the cathode of diode 84. The emitter of transistor 83 is coupled to the output 86 of the circuit and to the anode of a diode 84. In operation, transistor 83 is used to drive the output of the driver circuit high. Diode 84 and FET 81 are used to drive gate 83 low. In other words, with a low input, FET 81 is turned off and the voltage on the base of transistor 83 turns it on to provide a high voltage at output 86. When the input goes high, FET 81 is turned on, turning off transistor 83 and at the same time coupling the output 84 to ground.

The circuits of FIG. 2 and FIG. 3 can be manufactured with conventional components available from a number of different sources. Of course, implementation of these embodiments is not limited to the use of those components. Other components which can provide the necessary switching can be equally well used. These and other modifications can be made without departing from the spirit of the invention which is intended to be limited solely by the appended claims.

What is claimed is:

1. A DC-DC converter circuit comprising:
   a. a voltage input terminal;
   b. a voltage output terminal;
   c. a voltage reference;
   d. a first comparator having a first input coupled to said voltage reference and a second input coupled to said voltage output terminal and an output;
   e. a first FET driver having an input coupled to the output of said first comparator and an output;
   f. a second FET driver having an input coupled to the output of said first comparator and an output;
   g. a high side power FET and a low side power FET arranged in a synchronous totem pole configuration with a junction point between said high side power FET and said low side power FET, coupled between said voltage input terminal and ground, said junction point coupled to said voltage output terminal;
   h. said high side power FET having a control input coupled to the output of said first FET driver;
   i. said low side power FET having a control input coupled to the output of said second FET driver; and
   j. said high side power FET and said low side power FET coupled to each other in such a manner that an event of one turning off will turn the other on after a status level is sensed true.

2. A DC-DC converter circuit according to claim 1 wherein said coupling of said high side power FET and said low side power FET to each other includes a first threshold sensing circuit coupled between the output of said second FET driver and the input of said first FET driver.

3. A DC-DC converter circuit according to claim 2 wherein said first threshold sensing circuit comprises a first signal FET.

4. A DC-DC converter circuit according to claim 3 wherein said coupling of said high side power FET and said low side power FET to each other further includes a second threshold sensing circuit coupled between the output of said high side and low side power FET and the input of said second FET driver.

5. A DC-DC converter circuit according to claim 4 wherein said second threshold sensing circuit comprises a second signal FET.

6. A DC-DC converter circuit according to claim 5 and further including a Shottky diode coupled between said second signal FET and said second FET driver.

7. A DC-DC converter circuit according to claim 6 and further including a resistor coupling the junction of said high side power FET and said low side power FET to the input of said second FET driver.

8. A DC-DC converter circuit according to claim 7 and further including a second comparator having a first input coupled to said voltage reference derivative, and a second input coupled to a source of voltage having a value offset from said output voltage and an output coupled to said first FET driver.

9. A DC-DC converter circuit according to claim 8 and further including a second input voltage terminal and wherein the source of voltage, having a value offset from the output voltage comprises a resistor divider having a junction point coupled to said second input of said second comparator, said resistor divider coupled across said output voltage terminal and said second input voltage terminal.

10. A DC-DC converter circuit according to claim 9 and further including a third signal FET having a gate coupled to the output of said first comparator and having an output terminal, a pull-up resistor coupling said output terminal to said second voltage input terminal and said output terminal coupled to said input of said first FET driver.

11. A DC-DC converter circuit according to claim 9 wherein signals from the output of said second comparator and said first signal FET are ORed at said output terminal of said third signal transistor.

12. A mobile computer system comprising:
   a. a processor;
   b. a first DC-DC converter circuit comprising:
      i. a voltage input terminal;
      ii. a voltage output terminal;
      iii. a voltage reference;
      iv. a first comparator having a first input coupled to said voltage reference and a second input coupled to said voltage output terminal and an output;
      v. a first FET driver having an input coupled to the output of said comparator and an output;
      vi. a second FET driver having an input coupled to the output of said comparator and an output;
      vii. a high side power FET and a low side power FET arranged in a synchronous totem pole configuration with a junction point between said high side power FET and said low side power FET, coupled between said voltage input terminal and ground, said junction point coupled to said output terminal;
      viii. said high side power FET having a control input coupled to the output of said first FET driver;
      ix. said low side power FET having a control input coupled to the output of said second FET driver; and
      x. said high side power FET and said low side power FET coupled to each other in such a manner that an event of one turning off will turn on the other after a status level is sensed true.

13. A mobile computer system according to claim 12 wherein said coupling of said high side power FET and said low side power FET to each other includes a first threshold sensing circuit coupled between the output of said second FET driver and the input of said first FET driver.

14. A mobile computer system according to claim 13 wherein said first threshold sensing circuit comprises a first signal FET.

15. A mobile computer system according to claim 14 wherein said coupling of said high side power FET and said low side power FET to each other further includes a second threshold sensing circuit coupled between the output of said high side and low side power FET and the input of said second FET driver.

16. A mobile computer system according to claim 15 wherein said second threshold sensing circuit comprises a second signal FET.

17. A mobile computer system according to claim 16 and further including a Shottky diode coupled between said second signal FET and said second FET driver.

18. A mobile computer system according to claim 17 and further including a resistor coupling the junction of said high side power FET and said low side power FET to the input of said second FET driver.

19. A mobile computer system according to claim 18 and further including a second comparator having a first input coupled to said voltage reference and a second input coupled to a source of voltage having a value offset from said output voltage an output coupled to said first FET driver.

20. A mobile computer system according to claim 19 and further including a second input voltage terminal and wherein source of voltage having a value offset from the output voltage comprises a resistor divider having a junction point coupled to said second input of said second comparator, said resistor divider coupled across said output voltage terminal and said second input voltage terminal.

21. A mobile computer system according to claim 20 and further including a third signal FET having a gate coupled to the output of said first comparator and having an output terminal, a pull-up resistor coupling said output terminal to said second voltage input terminal and said output terminal coupled to said input of said first FET driver.

22. A mobile computer system according to claim 21 wherein signals from the output of said second comparator and said first signal FET are ORed at said output terminal of said third signal transistor.

23. A mobile computer system according to claim 22 and further including:
   a. a dc power source having a first voltage output coupled to said voltage input terminal;
   b. a first voltage source providing a second voltage output coupled to said second input terminal; and
   c. a second voltage source providing a third voltage output coupled to said voltage reference.

24. A mobile computer system according to claim 23 and further including:
   a. a linear voltage converter having said first voltage output as an input and as providing as an output said second voltages;
   b. a microcontroller having said second voltage as an input and having first and second output ports at which said second voltage is selectively present;
   c. second and third DC-DC converter circuits identical to said first voltage invention; outputting respectively first second and third converted voltages at their respective output terminals;
   d. said first port coupled to the second input terminal of each of said first, second and third DC-DC converters;
   e. said second port coupled to said voltage reference of said first DC-DC converter;
   f. said first converted voltage coupled to said voltage reference of said second DC-DC converter;
   g. said second converted voltage coupled to said voltage reference of said third DC-DC converter;
   h. TTL circuits having a voltage input coupled to said first converted input; and
   i. said second and third converted voltages coupled to said processor.

25. A method of carrying out a DC-DC voltage conversion using a high side power FET and a low side power FET, each having a gate with a variable discharge time dependent on applied voltage, arranged in a synchronous totem pole configuration with a junction point between said high side power FET and said low side power FET, coupled between an voltage input terminal and ground, the junction point coupled to a voltage output terminal, each of the power FETs being driven by a FET driver, said driver being coupled to the output of a comparator comparing a reference voltage with the output voltage, the method comprising:
   a. coupling said high side power FET and said low side power FET to each other in such a manner that an event of one turning off will turn on the other after a status level is sensed true.

26. The method according to claim 25 and further including sensing a short circuit condition with a second comparator and turning off said high side FET in response to detecting a short circuit.

27. The method according to claim 26 and further including latching said comparator when a short circuit is detected.

28. The method according to claim 25 wherein said DC-DC conversion is carried out in a mobile computer having a battery and said applied voltage is the voltage of said battery.

* * * * *